United States Patent [19]

Palmer

[11] Patent Number: 4,482,805
[45] Date of Patent: Nov. 13, 1984

[54] FIBER OPTIC MATRIX MULTIPLIER

[75] Inventor: John P. Palmer, Pomona, Calif.

[73] Assignee: General Dynamics, Pomona Division, Pomona, Calif.

[21] Appl. No.: 358,499

[22] Filed: Mar. 15, 1982

[51] Int. Cl.³ .............................................. G02B 5/14
[52] U.S. Cl. ................................. 250/227; 350/96.15; 367/140
[58] Field of Search ............... 350/96.14, 96.15, 96.24, 350/96.25; 455/605–608, 610–612; 367/140, 149; 250/237 G, 227; 358/200, 206, 207; 364/845, 713, 837

[56] References Cited

U.S. PATENT DOCUMENTS

| 1,750,785 | 3/1930 | Randall et al. |
| 2,945,626 | 7/1960 | Vance et al. |
| 3,305,669 | 2/1967 | Fan ...................................... 364/845 |
| 3,588,486 | 6/1971 | Rosen . |
| 3,666,358 | 5/1972 | Banks . |
| 3,764,213 | 10/1973 | O'Meara . |
| 3,867,627 | 2/1975 | Nelson et al. |
| 3,906,220 | 9/1975 | Delingat ............................. 250/227 |
| 3,944,820 | 3/1976 | Stotts . |
| 4,009,380 | 2/1977 | Bocker et al. ...................... 364/837 |
| 4,079,382 | 3/1978 | Henry . |
| 4,084,880 | 4/1978 | Clow . |
| 4,111,524 | 9/1978 | Tomlinson . |
| 4,310,905 | 1/1982 | Palmer ............................. 350/96.15 |

Primary Examiner—David C. Nelms
Assistant Examiner—J. J. Brophy
Attorney, Agent, or Firm—Henry M. Bissell; Edward B. Johnson

[57] ABSTRACT

A matrix multiplier system incorporating an integrated fiber optic coupling array in combination with an arrangement for individually modulating the signals on the respective optical fiber transmission lines to develop the matrix multiplication. Each of the individual couplers accomplishes the coupling of an input signal into a bi-directional fiber optic transmission line with high efficiency and unilateral coupling effect. The signal thus coupled into the bi-directional transmission line is reflected back to the coupler output after multiplication by the modulating vector component for the individual coupler element. Because of the fabrication of a large number of identical fiber optic couplers in a compact, integral array and the manner in which the light signals can be modulated, the matrix multiplier system is extremely effective in pattern recognition, signal discrimination, selected signal enhancement, and the like.

29 Claims, 20 Drawing Figures

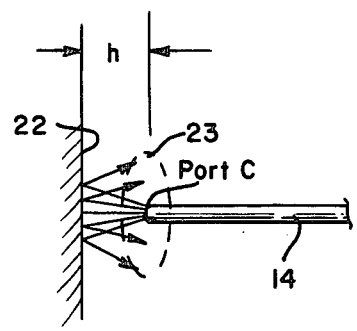
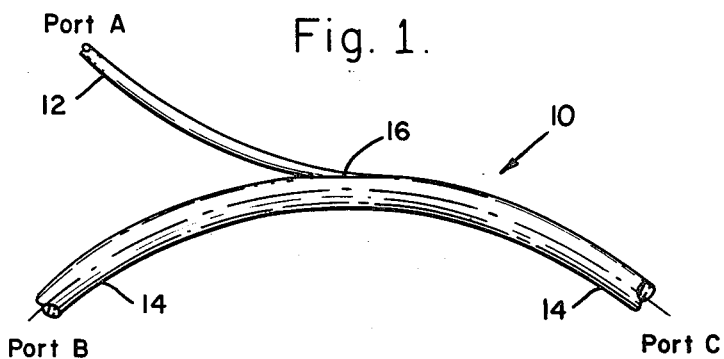
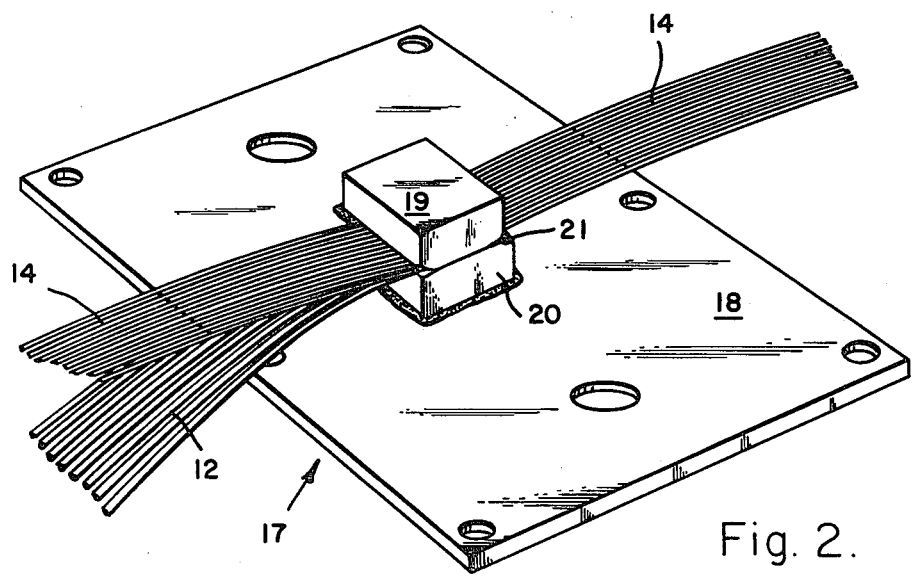
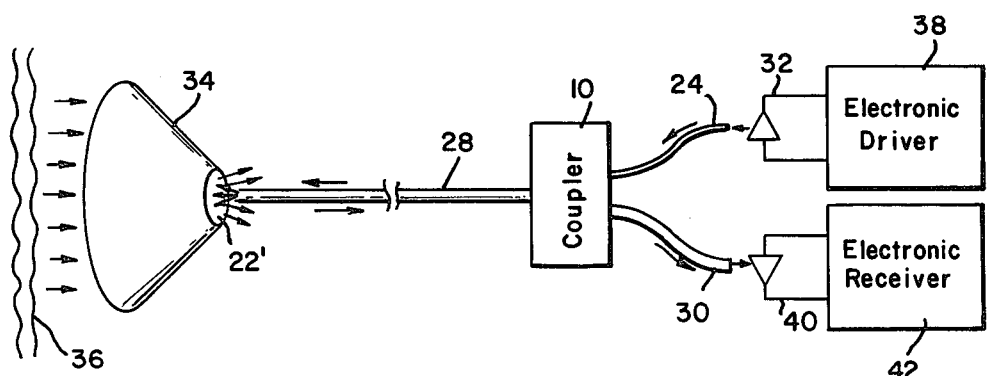

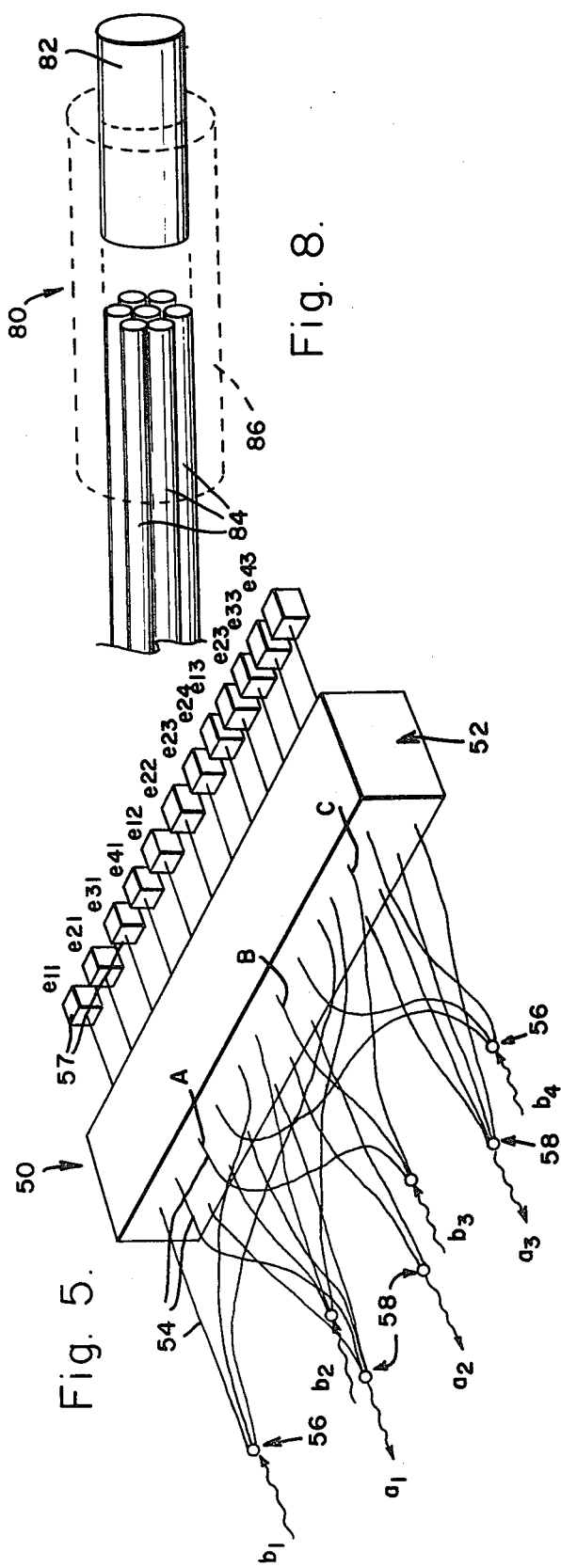
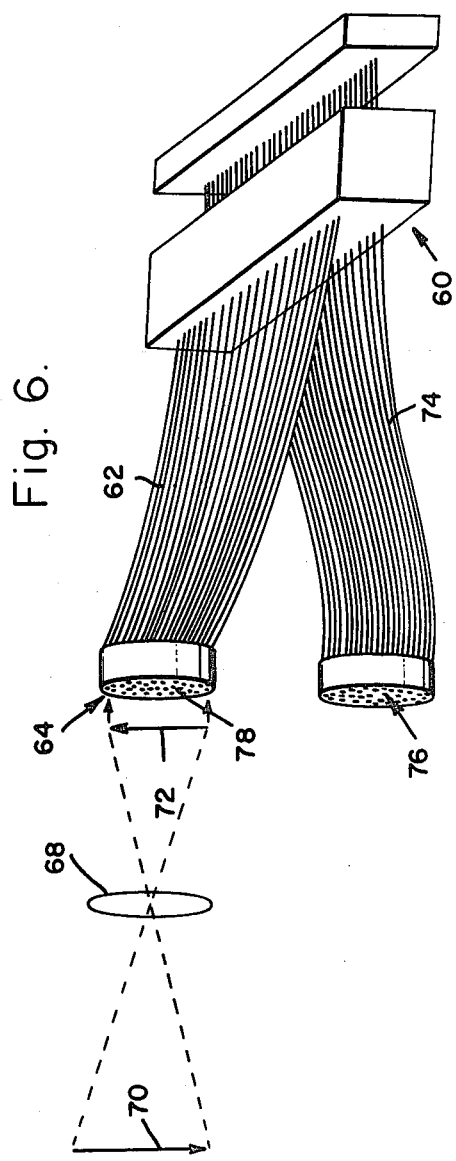

FIBER OPTIC MATRIX MULTIPLIER

BACKGROUND OF THE INVENTION

1. Field of the Invention

This invention relates to matrix multiplier systems and, more particularly, to such systems utilizing fiber optic coupling arrays.

2. Description of the Prior Art

The present invention performs a specific class of matrix operations. This operation is the multiplication of an N-dimensional vector by an N-by-M-dimensional matrix. The product of such an operation is an M-dimensional vector. In matrix algebra notation, the operation is written symbolically as $$\overline{A} = \overline{B} \times \overline{\overline{E}}, \quad (1)$$

where $\overline{B} = \overline{B} (b_1, b_2, \ldots, b_N)$ is an N-dimensional vector having N components $b_1, b_2, \ldots, b_N$;

$$\overline{\overline{E}} = \begin{pmatrix} e11, e12 \ldots e1M \\ e21, e22 \ldots e2M \\ \cdot \\ \cdot \\ eN1, eN2 \ldots eNM \end{pmatrix}$$

is an N-by-M-dimensional matrix having N-times-M components; and $\overline{A} = \overline{A} (a_1, a_2, \ldots, a_M)$ is an M-dimensional vector. An alternative symbolic representation of matrix multiplication is written as follows:

$$ai = \sum_{j=1}^{N} bj \times eji, \quad (2)$$

where i and j are indices for the vector and matrix components (i=1, 2, ..., M and j=1, 2, ..., N), and the symbol $$\sum_{j=1}^{N}$$

means that all of the products $b_j \times e_{ji}$ are summed for every value of j between 1 and N. Equation (2) is the formula by which the product components are calculated if the components $b_j$ and $e_{ji}$ are known.

Multiplication operations of the type indicated by Equations (1) and (2) conventionally are berformed by electronic digital binary computers. This conventional process is performed by loading each of the components to be multiplied (the $b_j$s and the $e_{ji}$s) into digital memory devices, extracting the components one-by-one from memory into an arithmetic logic unit (ALU), and then the ALU multiplies the components and stores the products in selected memory elements.

This operation of matrix multiplication is considered, by people who are acquainted with digital computers, to be both time-consuming and memory extensive. Depending on the size of the vectors and the matrices, and depending on the speed of memory access, this operation may require several seconds and many tens of thousands of memory locations. Consequently, the computers required to perform this operation have high-capacity memories, and they are costly.

Several examples are known in the prior art of the use of electro-optical systems for matrix-vector multiplication to circumvent the dependence upon computers for such operations. Examples of such may be found in U.S. Pat. Nos. 3,305,669 of Fan, 3,588,486 of Rosen, 3,944,820 of Stotts, and 4,009,380 of Bocker et al. Some of these systems depend upon optical masks or the equivalent (either transmissive or reflective) in modulating light energy. The Stotts patent uses polarized light in conjunction with successive phase-synchronized modulators and optical waveguides.

U.S. Pat. Nos. 3,906,220 of Delingat and 3,937,952 of Ripley et al have been found which use intermixed sets of optical fibers for various specific purposes. The former is directed to an optical correlator, whereas the latter is directed to use in a keyboard for multi-digit encoding.

The present invention employs to particular advantage in a matrix multiplying system an integral array of substantially identical, fiber optic couplers. These couplers are of the unidirectional type, referred to as launch couplers, disclosed for example in my U.S. Pat. No. 4,307,933 entitled OPTICAL FIBER LAUNCH COUPLER, of which I am named as inventor with Phillip B. Ward, Jr. The fabrication of an array of such launch couplers is disclosed in U.S. application Ser. No. 333,955 filed Dec. 23, 1981, entitled FIBER OPTIC COUPLER ARRAY AND FABRICATION METHOD of John P. Palmer and Phillip B. Ward, Jr., assigned to the assignee of this invention. The disclosure of that application is incorporated herein by reference. In brief, an array of substantially identical launch couplers is fabricated by preparing first and second support blocks with pluralities of parallel grooves and placing appropriate optical fibers in the grooves. Each launch coupler comprises a launch fiber and a throughput fiber. Epoxy resin is applied to embed the respective fibers in their blocks and then the resin and embedded fibers are lapped to develop opposed mating planar surfaces. The launch fibers are lapped entirely through the cores to expose severed end surfaces of generally elliptical shape. The throughput fibers are lapped only deep enough to expose a corresponding surface of like extent and dimensions. The two blocks are then joined at the planar surfaces, and the array of launch couplers is aligned while applying light signals to the input ports of two launch fibers at opposite ends of the array and monitoring the light output at the output ports of the corresponding throughput fibers until the output is maximized. Preferred apparatus for use in the alignment procedure is disclosed in U.S. Pat. No. 4,302,267 entitled OPTICAL FIBER MATING APPARATUS AND METHOD of Palmer and Ward. Afterward the two blocks are affixed to each other by epoxy resin or other suitable adhesive. An array of launch couplers fabricated in this fashion can be used as the basis of a matrix multiplier system.

SUMMARY OF THE INVENTION

In brief, arrangements in accordance with the present invention incorporate a launch coupler array of the type just described in matrix multiplier systems. In such an array, light energy applied to the launch fiber exits from the opposite throughput fiber end with about 1 dB of loss (the insertion loss) and with very little light appearing at the other throughput fiber end. However, light entering either throughput fiber end exits from the other throughput fiber end with only about 0.5 dB of loss (the throughput loss). For light applied to the throughput fiber, almost no light appears at the end of the launch fiber. With suitable fiber sizes and spacing, a single tier array of 50 couplers can fit in a volume of 1 inch long×0.5 inches high by 0.5 inches deep. Such tiers can be stacked to achieve corresponding volumetric efficiency with many thousands of individual launch coupler elements.

In the present invention, such arrays are combined with optical reflectors in the manner disclosed in my prior U.S. Pat. No. 4,310,905 entitled ACOUSTICAL MODULATOR FOR FIBER OPTIC TRANSMISSION, the disclosure of which is incorporated herein by reference. Briefly, that patent describes particular ways in which varying the distance between the end of an optical fiber and a reflective surface can be used to vary the amount of reflected light transmitted by the fiber. The spacing can be fixed for certain signal transmissions, or it can be varied in accordance with a modulation signal for other signal transmissions. The use of such concepts in conjunction with the launch coupler arrays as previously disclosed provides added flexibility in the realization of fiber optic matrix multiplier systems of the present invention.

BRIEF DESCRIPTION OF THE DRAWING

A better understanding of the present invention may be had from a consideration of the following detailed description, taken in conjunction with the accompanying drawing in which:

FIG. 1 is a schematic representation of a single launch coupler employed in arrangements of the present invention;

FIG. 2 is a drawing of a plurality of such couplers in an integral array;

FIG. 3 is a schematic diagram representing the interaction between a single fiber end and a reflective surface as utilized in the present invention;

FIG. 4 is a schematic block diagram illustrating a single fiber optic system, the principles of which are employed in the present invention;

FIG. 5 is a schematic representation of a simplified embodiment exemplifying the present invention;

FIG. 6 is a schematic block diagram of one particular arrangement in accordance with the invention;

FIG. 8 is a diagram illustrating a particular element which may be used in arrangements of the present invention;

DESCRIPTION OF THE PREFERRED EMBODIMENTS

Figure 7:
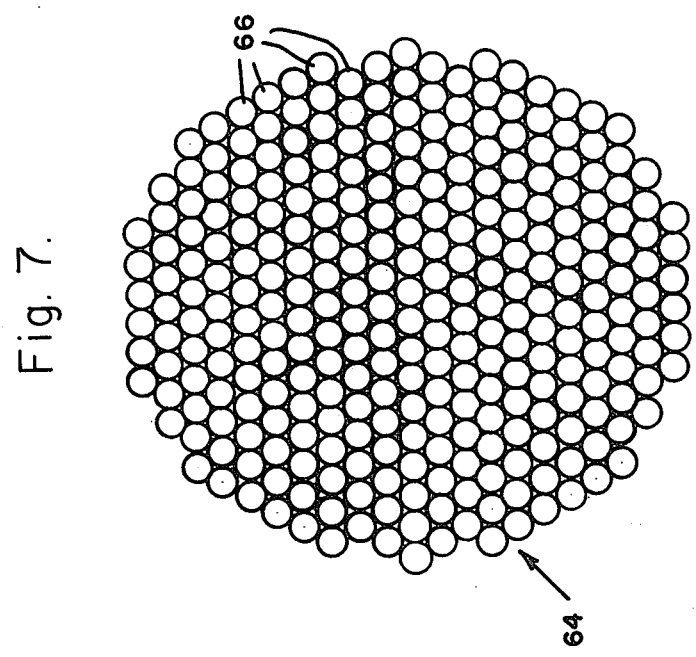
FIG. 7 is a diagram illustrating, in enlarged form, a particular portion of the diagram of FIG. 6.

In the schematic diagram of FIG. 1, a launch coupler 10 of the type utilized in the present invention is shown comprising a launch fiber 12 and a continuous throughput fiber 14. It will be noted that the launch fiber is preferably smaller in diameter than the throughput fiber. In preparation of the launch coupler, both fibers 12 and 14 are mounted in appropriate grooves on respective blocks (not shown), embedded in epoxy, and then respectively lapped to develop optically flat, planar surfaces. The depth of lapping of the launch fiber is sufficient to completely sever the fiber core. The other portion of the launch fiber 12 is omitted from the diagram for the sake of simplicity, since it is not used. The throughput fiber 14 is lapped to a sufficient depth to develop an exposed surface of the fiber core which substantially matches the exposed surface of the severed launch fiber, and these two exposed surfaces are matingly joined at the coupling interface 16. The result is a three-port coupler which is particularly efficient as a unidirectional, or launch, coupler. Light entering Port A exits Port C with about 1 dB of insertion loss, while the light appearing at Port B is negligible. However, light entering either Port B or Port C exits the other port of the throughput fiber 14 with a throughput loss of about 0.5 dB and with almost no light appearing at Port A. An integrated array of such couplers, fabricated in accordance with the description set forth hereinabove, is particularly effective when used in arrangements in accordance with the present invention to develop fiber optics in matrix multiplier systems.

Such an array is shown in FIG. 2 in the form of an assembly 17 comprising a base plate 18 having a plurality of holes, to facilitate mounting in alignment apparatus, and a pair of blocks 19, 20 to which pluralities of optical fibers 12, 14 are affixed. The lower block 20, to which the launch fibers are affixed, may be mounted to the plate 18 by any suitable means, for example by wax or adhesive (not shown). The upper block 19, to which the continuous throughput fibers 14 are affixed, is mounted to the upper surface of the block 20. Each of the blocks 19, 20 is fabricated with an optically flat mating surface lapped into a mound of epoxy resin, shown at 21. These mating surfaces are secured together by a suitable adhesive, such as epoxy, having the desired optical properties. Each of the launch fibers 12 of the assembly 17 is aligned with and joined to a corresponding throughput fiber 14 to develop an individual launch coupler of the type shown and described with respect to FIG. 1.

Each of the blocks 19, 20 of the assembly 17 of FIG. 2 has an arcuate surface on the side facing the other block and a plurality of longitudinal grooves formed therein for receiving the respective optical fibers 12 or 14. These grooves are cut across the curved surface of the respective blocks, are evenly spaced relatively close together, and are of uniform depth. The depth is selected to correspond to the size of the optical fibers mounted in the grooves. Thus, lapping of the epoxy resin and all of the fibers on a given block to develop an optically flat planar surface and joining of the two blocks together at their flat surfaces results in an array of substantially identical, individual launch couplers like that shown in FIG. 1.

Launch coupler arrays are utilized in the present invention by placing the ends of the throughput fibers adjacent a reflective surface. This is represented in FIG. 3 for a single fiber 14 in which the end designated Port C is adjacent a reflective surface 22, separated therefrom by a distance h. Light exiting Port C diverges in a conical pattern and this is reflected back to a plane 23 at the end of fiber 14. As indicated by the arrows, a portion of the reflected light will re-enter Port C for transmission back along the fiber 14. It will be seen that the proportion of the light exiting Port C which is reflected from the surface 22 back to Port C will vary as a function of the distance h. If this reflective surface 22 is a pressure sensitive reflective membrane 22', such as is indicated in FIG. 4, the reflected light is modulated by the function of the signal driving the membrane 22'.

In the block diagram of FIG. 4, a single coupler 10 as in FIG. 1 is shown having an input fiber 24 coupled to the launch fiber Port A, a bi-directional fiber 28, coupled to Port C, and an output fiber 30, coupled to the Port B. The input fiber 24 is positioned to receive input light signals from a photodiode 32 connected to be driven by an electronic driver 38. The reflective, pressure sensitive diaphragm 20' is coupled to a cone 34 positioned to be driven by a varying pressure wave front 36. The output fiber 30 is positioned to apply output light signals to a photodiode 40 which is coupled to an electronic receiver 42. Thus, the electrical signal generated by the driver 38 is converted at the photodiode 32 into a light signal which is applied through the coupler 10 and along the bi-directional fiber 28 to the reflective diaphragm 20'. There the light signal is reflected, the portion being received and transmitted back along the fiber 28 being modulated by the function of the pressure wave 36. As modulated, the light signal travels along fibers 28 and 30, is converted to electrical signals at the photodiode 40 and applied to the receiver 42.

A simplified array of such couplers and reflectors corresponding to the illustration of FIG. 4 is shown by way of example in FIG. 5, in which a small number of vector and matrix components are shown. This example is easily generalized to an arbitrary number of vector and matrix components. As discussed herein, the components of vectors $\overline{A}$ and $\overline{B}$ (Equations (1) and (2) above) are represented by optical signals, and the components of matrix $\overline{E}$ are represented by either static positions or by amplitudes of vibration of optical reflecting surfaces (mirrors). Hereinafter, the optical signals representing the components of vector $\overline{B}$, and which are directed into the matrix multiplier, are referred to as the input vector components, $b_j$; and the optical signals representing the components of vector $\overline{A}$, and which are directed out of the matrix multiplier, are referred to as the output vector components.

FIG. 5 illustrates an exemplary multiplier system 50, of which the key component is a 12-element monolithic array 52 of fiber optic directional couplers arranged in a 3×4-element matrix. Each element of this array is a three-port directional coupler of the type shown in FIG. 1 and the coupler array per se corresponds to FIG. 2. The 12 input fibers 54—the launch fibers—are arranged in four groups 56 of three fibers each. Each of these four input bundles receives an optical signal which represents a component of the input vector B; e.g., the third bundle from the left receives an optical signal representative of the component $b_3$. This signal divides equally among the three fibers in that bundle, designated A, B and C, and the optical signal in each of these fibers is also representative of the vector component $b_3$. The three fibers in this bundle transmit the optical signal $b_3$ to the 3rd, 7th, and 11th directional couplers, counting from the left, whereby the optical signal $b_3$ is coupled into the 3rd, 7th, and 11th optical fibers on the opposite side of the coupler array. These latter fibers are designated as "bidirectional" fibers because when reflective surfaces 57 are located opposite the ends of these fibers, a fraction of the optical signal emerging from each bidirectional fiber is reflected back into the same fiber and is transmitted in the opposite direction from the incident light energy. The relative magnitude of the signal coupled back into the fiber depends on the spacing between the reflective surface and the end of the fiber, as explained above in connection with FIGS. 3 and 4. For ease of presentation, the reflective surfaces 57 are represented as associated with modulating signals of the form $e_{ji}$. This relative fraction of light reflected back into the fiber is representative of an element of the matrix E; consequently the magnitude of light coupled back through the coupler and into an output fiber is representative of the product $b_3 \times e_{3i}$, where the index i is 1 for coupler No. 3, 2 for coupler No. 7, and 3 for coupler No. 11, as indicated in FIG. 5.

The 12 output fibers are grouped into three bundles 58 of four fibers each. Consequently the optical flux $a_i$ radiating from any one of these three bundles is the sum of the fluxes from each of the fibers in that bundle, and this summation is representative of the respective component of the output vector, $\overline{A}$. A careful examination of each of the optical paths in FIG. 5 shows that the three components of the output vector are given by the expressions:

$$a_1 = b_1 e_{11} + b_2 e_{21} + b_3 e_{31} + b_4 e_{41}$$

$$a_2 = b_1 e_{12} + b_2 e_{22} + b_3 e_{32} + b_4 e_{42} \quad (3)$$

$$a_3 = b_1 e_{13} + b_2 e_{23} + b_3 e_{33} + b_4 e_{43}$$

Equations (3) are the same as Equation (2) when $N=4$ and $M=3$.

The input vector components are optical signals; that is, the intensity of light coupled into the input fibers is representative of the magnitude of the respective vector components. If the light coupled into the fibers is coherent, as from laser sources, then the amplitudes and the phases of the optical signals may be representative of amplitudes and phases of the respective vector components. However, the optical sources used to date with the present invention have been noncoherent.

The optical signals representing the input vector components may be presented to the input ports of the matrix multiplier in a variety of different ways. Four alternative means are listed and are described as follows:

(1) The optical signals may be generated by electro-optical light-generating devices such as by light emitting diodes (LEDs) or by injection laser diodes (ILDs).

(2) The optical signals may be picture elements (pixels) of an image projected by means of lenses onto the end-surface array of input fiber bundles.

(3) The optical signals may be pixels of an illuminated surface in close proximity to the end-surface array of input fiber bundles.

(4) The optical signals may be pixels of an image generated on the phosphor surface of a cathode ray tube in close proximity to the input bundles.

An example of the first case is represented by the use of the exemplary multiplier of FIG. 5 in the manner indicated for a single coupler in FIG. 4. In such an arrangement a separate LED 32 is provided at each input fiber bundle 56. The optical signals coupled into the fiber bundles are proportional to the current driven through the LEDs by external drivers 38. Consequently, the input vector components are represented by the analog drive current values for the respective LEDs, whereby these vector components are generated electronically, as by a conventional computer.

An example of the second case of generation of the input vector components is illustrated in FIG. 6, in which the input fibers 62 of the launch coupler array 60 are mounted in the manner shown in FIG. 7 to form a close-packed array 64. Each circle in the diagram of FIG. 7 represents the end surface of a fiber bundle and is the input port for a particular vector component. The example of FIG. 7 represents 288 pixels. Thus, each bundle, such as 66 in FIG. 7, contains as many optical fibers as there are output ports (fiber bundles 58 in FIG. 5). For example, a 0.045-inch diameter bundle of 3-mil diameter fibers contains about 212 such fibers. Consequently, if the 288 bundles in FIG. 7 formed the input fiber array in FIG. 6, and if each bundle contained 212 fibers, then the output array would contain 212 bundles of 288 fibers each. (In this case the directional coupler array would have 61,056 couplers). The arrangement of FIG. 6 further shows a lens 68 positioned to project an image 70 in the position 72 in front of the input fiber bundle 64. The output fibers 74 are similarly bundled in the manner described to provide an output fiber bundle 76. In accordance with the matrix arrangement of FIG. 5, these output fiber bundles 76 would comprise 288 fibers each, there being 212 such bundles 76. The block 79 represents an array of reflectors such as the reflector/modulator arrangement of FIG. 3 or FIG. 4. Alternatively, the block 79 may represent other reflective arrays such as are shown in FIGS. 9, 10, 11 or 12 and described hereinbelow.

FIG. 6 may be used to illustrate the third case of generation of input vector components in which a "hard copy" of the image is presented in close proximity to the fiber array, as the arrow 72 representing the image, rather than projecting the image through the lens 68. In this example, the image may be illuminated either from the front side (the side adjacent the fiber array) or from the back side. In this manner, light is transmitted to the input fiber bundles in proportion to light transmitted through, or reflected by, the image on the hard copy. Alternatively, the image presented to the input ports of the matrix multiplier in this manner may be a pattern on a manufactured surface to be processed by the matrix multiplier for the purpose of quality assurance.

An example of the fourth case of generation of the input vector components is like that illustrated in FIG. 6, except that the surface 78 of the input fiber bundle array is contoured to match the face plate of a cathode ray tube (CRT). The CRT may be the display element of an oscilloscope, or of a television receiver, or of a computer terminal.

In order to assure that each of the fibers in a given input fiber bundle is illuminated uniformly, it may be necessary in some applications of the four cases described above to provide a short optical diffusion rod in front of each of the terminated bundles. One such termination member 80 is illustrated in FIG. 8 as comprising a diffusion rod 82 held in position adjacent a bundle of optical fibers 84 by a support tube 86. The diffusion rod 82 is shown withdrawn slightly from the fibers 84 for the purpose of illustration. The diffusion rod 82 is a glass rod of uniform composition having the same index of refraction as the cores of the optical fibers 84. The length of the diffusion rod 82 is preferably about four times its diameter, which is the same as the diameter of a fiber bundle. Consequently, an array of diffusion rods placed in front of the input bundles may appear as shown for the optical fiber bundles in FIG. 7.

As has been indicated, a variety of alternative reflector configurations may be utilized in matrix arrays such as are shown in FIGS. 5 and 6, for example. The selection of the appropriate reflector configuration may depend on the nature of the matrix elements and on the strength of the optical signal relative to background level. If all of the matrix elements have the same sense (unipolar matrix elements), then the value of a matrix element may be directly proportional to the fraction of light reflected back into the bidirectional fiber. As noted above with respect to FIGS. 3 and 4, for example, this reflection coefficient is related to the spacing between the end of a bidirectional fiber and the reflective surface opposite that fiber. Alternatively, the value of a unipolar matrix element $e_{ji}$ may be represented by the amplitude of vibration of an oscillating reflector surface. This latter structure is preferred when high resolution and accuracy of the matrix elements is required. The alternating reflected signal can be filtered in the electronic receiver in order to discriminate between the signal representing the matrix element (which is due to reflection by the oscillating reflector) and the constant light level due to reflection by the directional coupler.

Figure 9:
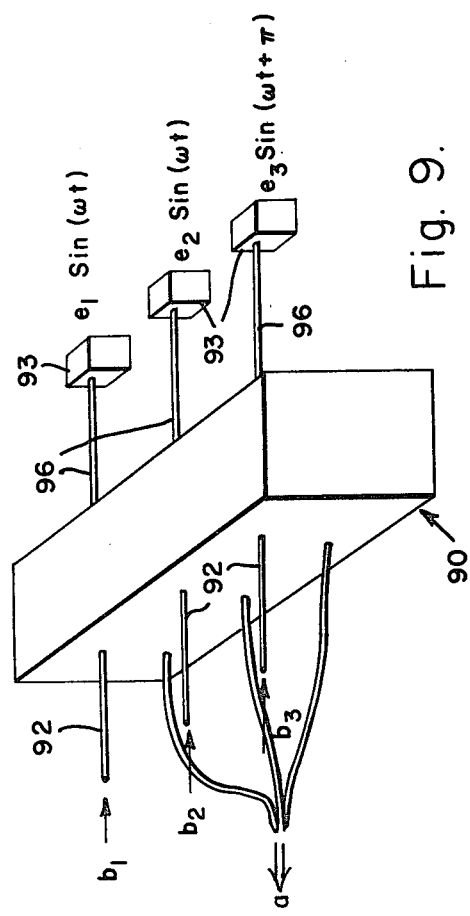
FIG. 9 is a schematic block diagram illustrating one particular form of the arrangement of FIG. 5.

Since the modulation of the input light levels by the reflectors is inherently unipolar (because the reflection process is passive), bipolar matrix elements cannot be represented by static reflectors. However, bipolar matrix elements can be represented by the amplitude of vibration of oscillating reflectors, wherein matrix elements with opposite senses are represented by reflectors which vibrate with a 180-degree phase difference. This effect is illustrated in FIG. 9, in which an array 90 of three identical launch couplers is shown with signal inputs $b_1$, $b_2$ and $b_3$ applied to three input, or launch, fibers 92, respectively. The optical reflection coefficients at the reflector elements 93, equivalent the modulation of light signals re-entering the bi-directional fibers 96, are $e_1 \sin(\omega t)$, $e_2 \sin(\omega t)$, and $e_3 \sin(\omega t + \pi)$, respectively. The resulting optical signals in the three output fibers 94 are $b_1 e_1 \sin(\omega t)$, $b_2 e_2 \sin(\omega t)$, and $b_3 e_3 \sin(\omega t + \pi)$, respectively. If these three output signals are summed at a common photodetector, as by joining the three fibers 94 together in the manner shown in FIG. 9 adjacent a photodiode as in FIG. 4, then the output signal (electrical) from that photodiode is proportional to $$a = b_1 e_1 \sin(\omega t) + b_2 e_2 \sin \omega t + b_3 e_3 \sin(\omega t + \pi) \quad (4)$$
$$= (b_1 e_1 + b_2 e_2 - b_3 e_3) \sin \omega t.$$

Consequently, the matrix coefficient, $e_3$, is effectively opposite in sense to the matrix coefficients, $e_1$ and $e_2$.

Figure 10:
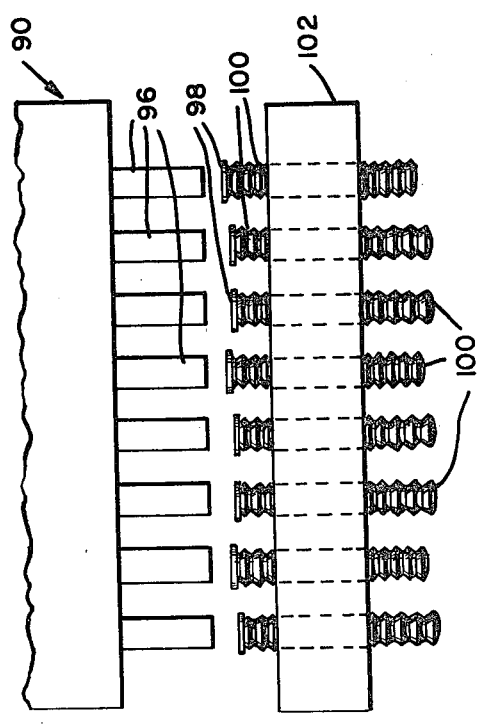
FIG. 10 is diagram illustrating a portion of the arrangement of FIG. 5.

In applications where static reflectors are appropriate, they may be fixed or adjustable. For example, the reflective surfaces may be attached to individual adjustment screws, as illustrated in FIG. 10. In the arrangement shown in FIG. 10, the coupler array 90 is depicted with bidirectional fibers 96 having their terminal ends adjacent individual reflectors 98. These reflectors 98 are positioned at different selected distances from the ends of the bidirectional fibers 96, the spacing being established by adjusting screws 100 on which the reflectors 98 are mounted being threadably fixed within a support block 102. The reflectors 98 are piezoelectric crystals supported on the ends of the adjusting screws 100 for modulating the light signal being directed back into the bidirectional fibers 96. The piezoelectric crystals 98 are driven via conductors (not shown) from a suitable driving source and have reflecting surfaces facing the fibers 96. Thus, the positioning of the reflectors 98 by means of the adjusting screws 100 develops a reference spacing, or DC bias, which is varied in accordance with the modulating waveform applied to the piezoelectric crystal.

Figure 11:
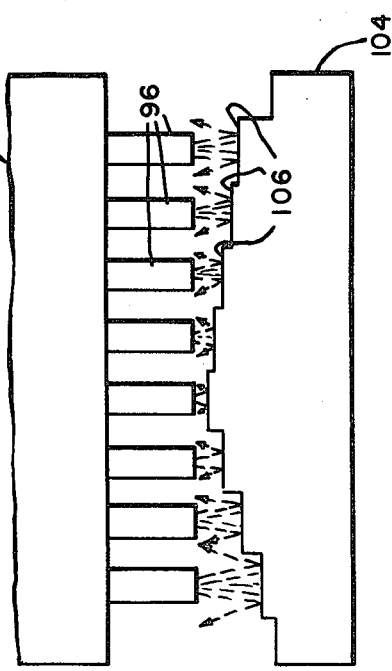
FIG. 11 is a schematic block diagram illustrating the use of the structure of FIG. 10.

An alternative modulating arrangement is depicted schematically in FIG. 11 in which the coupler array 90 and bidirectional fibers 96 are shown in operative position adjacent a terraced reflector block 104. The block 104 is formed with a terraced contour comprising individual stepped surfaces 106 facing corresponding ends of the fibers 96. The terraced contour may be machined or etched on the block 104 and the relative spacing between the respective stepped surfaces and the corresponding ends of the fibers 96 determines the static reflection coefficients for the matrix multiplier. It will be understood that the reflector block 104 may be a piezoelectric crystal or some other reflector assembly which may be caused to vibrate by the application of a varying modulation signal.

Figure 12:
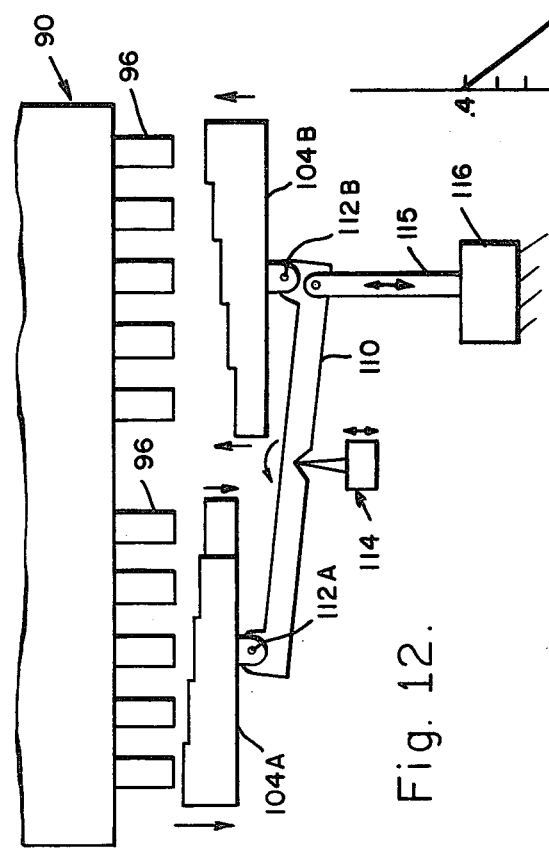
FIG. 12 is a diagram similar to that of FIG. 11, but illustrating a variant thereof.

A variant of the arrangement of FIG. 11 is shown in FIG. 12 in which two reflector blocks 104A and 104B are shown associated with corresponding optical fibers 96 which are arrayed in two groups. Each of the blocks 104A and 104B is formed in the manner described for the block 104 of FIG. 11 and is pivotably mounted on a bar 110 at pivot points 112A and 112B. The bar 110 is supported on a fulcrum support 114 and the entire structure is movable in the fashion of a seesaw. As one reflector block, such as 104B, moves toward its corresponding set of bidirectional fibers 96, the other reflector block 104A is moving away from its corresponding set of fibers. The pivot arm 110 is coupled by arm 115 to be driven by a mechanical vibrator 116. Inasmuch as the dynamic light intensity modulation depends on the slope of the modulation curve as shown in FIG. 13, the reflector mean positions (i.e., the mean spacing of the blocks from the fibers 96) are selected accordingly by positioning the support 114.

Figure 13:
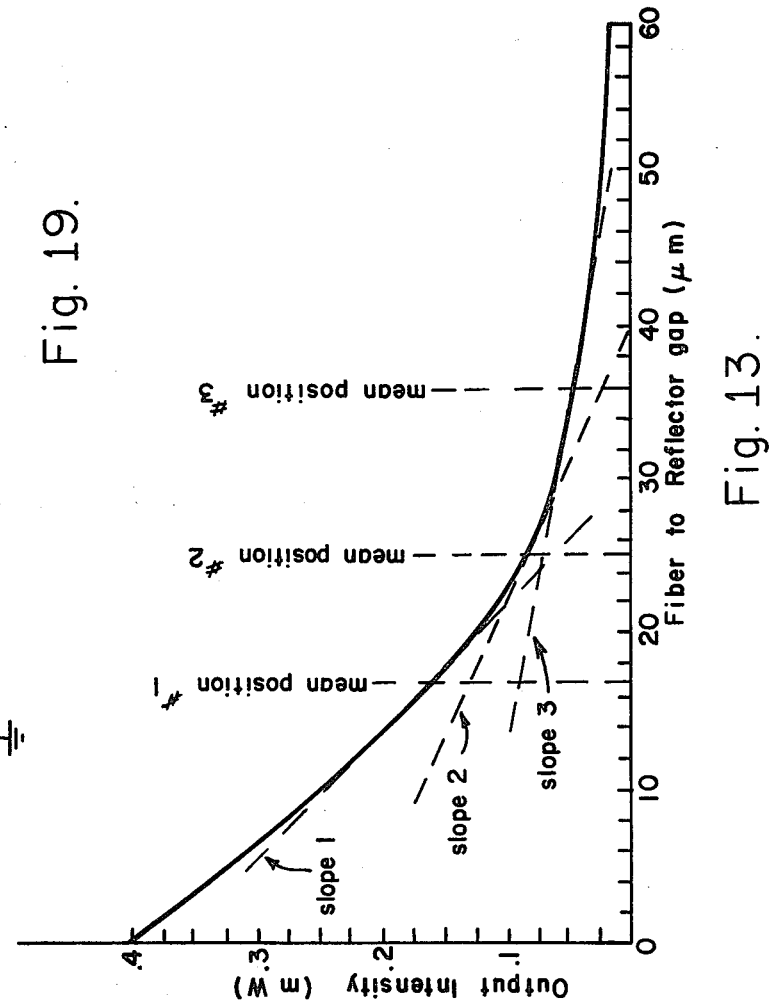
FIG. 13 is a graph showing the effect of variations in the parameters illustrated in FIG. 10.

FIG. 13 is a graph showing the effect of three different mean positions of the reflector block assembly of FIG. 12. In FIG. 13, output intensity is plotted as a function of the fiber-to-fiber reflector gap. Each of the reflector elements vibrates with the same amplitude (because they are on a monolithic structure). Consequently, the relative values of the dynamic reflection amplitudes are proportional to the slopes of the calibration curve at the three mean position locations which are indicated. In other words, the range and resolution of the matrix element representations depend on the nonlinearity of this calibration curve.

In various arrangements embodying the invention, the reflected light entering the bidirectional fibers is transmitted through the coupling array to the respective output fibers. As illustrated in the example of FIG. 5, the output fibers from all of the coupler elements are grouped in a set of bundles in a manner such that each output bundle includes one output fiber corresponding to each of the input bundles. Thus, as shown in FIG. 5, where there are four input bundles each having three input fibers, there are three output bundles each having four output fibers. Each of these output bundles is terminated at an interface to a separate electro-optical sensor such as photodiode, in the manner shown for an individual fiber element in FIG. 4. The output of this sensor is an electrical current which is proportional to the summation of the light outputs from each of the fibers in the corresponding output bundle.

Alternatively, the end surfaces of each of the output bundles may be terminated by an optically diffusion rod (see FIG. 8) such that the optical output from each of the bundles is diffused uniformly as it exits from the diffusion rod. In such an arrangement, the output from matrix multiplier is an array of diffusion rod surfaces, each of which emits a uniform spot of light. Such an array may be arranged in a planar (or curved) surface for visual display or for photographic reproduction.

Figure 14:
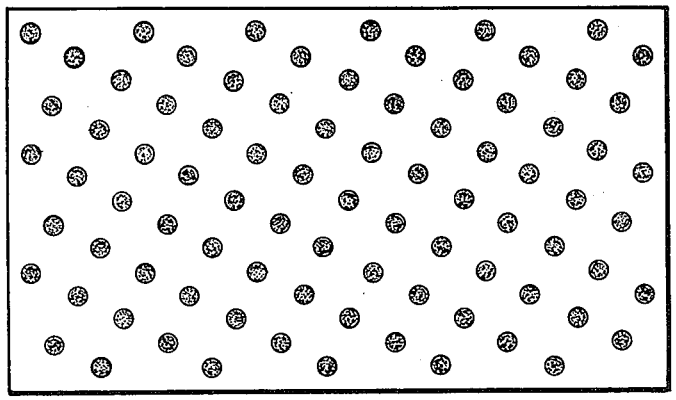
FIGS. 14–17 are various representations of patterns with which arrangements of the present invention may be used to advantage.
Figure 15:
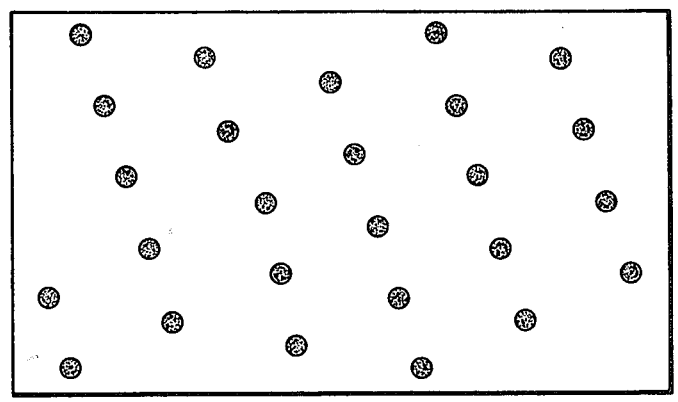
Figure 16:
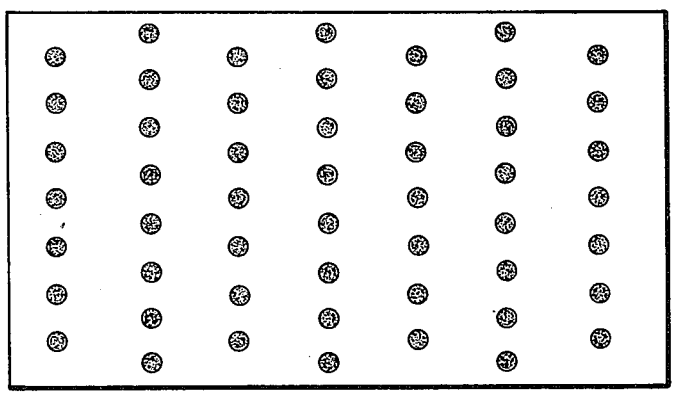
Figure 17:
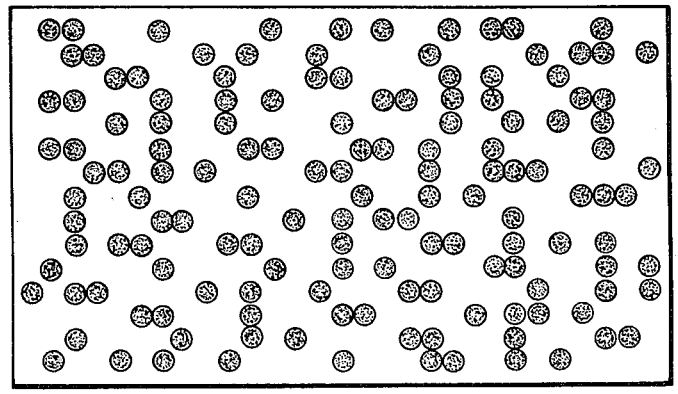

The following example illustrates the application of an embodiment of the present invention to a specific method of pattern recognition. FIG. 14 illustrates a specific array of dark circles in a symmetrical pattern. FIGS. 15 and 16 illustrate similar arrays in different symmetrical patterns. The array of FIG. 14 is periodic with a fundamental spatial period of five spaces, where each line is scanned from left to right. The arrays in FIGS. 15 and 16 are periodic with fundamental spatial periods of 17 and eight spaces, respectively. FIG. 17 shows a composite matrix of dark circles obtained by superposition of the arrays of FIGS. 14–16. The periodicities (i.e., the symmetry) of the pattern in FIG. 17 are not apparent from a casual view of the figure. However, if an array of input fiber bundles is superimposed on the pattern of FIG. 17, one input bundle for each space of the array, such that the bundles opposite the dark circles are not illuminated and the bundles opposite the light circles are illuminated by a single uniform light intensity, then the matrix multiplier provides the spatial frequency components of each of the superimposed periodic patterns by means of Fourier analysis.

There are 392 spaces in the arrays of FIGS. 14–17. This also is the number of input fiber bundles. Suppose it is desired to resolve the first 30 spatial frequency components of the pattern in FIG. 17. Then each of the 392 bundles will contain 30 fibers. This analysis is achieved by way of the Fourier transform expressed by Equation (5):

$$a_m = a(\lambda/m) = \sum_{n=1}^{392} b_n \sin \frac{2\pi n x_o}{\lambda_o/m} \quad (5)$$

$$= \sum_{n=1}^{392} b_n e_{nm},$$

$$\text{where} \quad e_{nm} = \sin \frac{2\pi x_o n m}{\lambda_o} = 2\pi \frac{x}{\lambda} \quad (6)$$

The argument of the sine function is periodic with respect to $x = n x_o$ and with respect to $\lambda = \lambda_o/m$. Let $x_o$ be the lateral dimension of one space (say, 1 millimeter), and let $\lambda_o$ be a dimension longer than the longest expected wavelength of periodicity (say, 60 spaces or 60 mm). Then Equation (5) becomes:

$$a_m = \sum_{n=1}^{392} b_n \sin \frac{2\pi nm}{60} \quad (7)$$

where m = 1, 2, ..., 30. Observe that for this example $b_n$ is binary, i.e., it is 1 for a space which is light, and it is 0 for a space which is dark. In general, however, a continuous spectrum of gray scales may exist with no change required in the apparatus of this invention.

The values for $e_{nm} = \sin 2\pi/60$ nm are the matrix elements for the positions of the reflectors opposite the fiber optic coupling elements. These reflectors are indexed by the integers n = 1, 2, ..., 392 and m = 1, 2, ..., 30. Note that the positions of the reflectors could be static if the matrix values, $e_{nm}$, were all of the same sign (all positive or all negative). However, in this example, the values of $e_{nm}$ are not all the same sign; some are positive and others are negative. Consequently, an alternative to static reflectors has been devised to provide an effective sign for the matrix elements. This involves phase modulation of fluctuating reflector positions.

Figure 18:
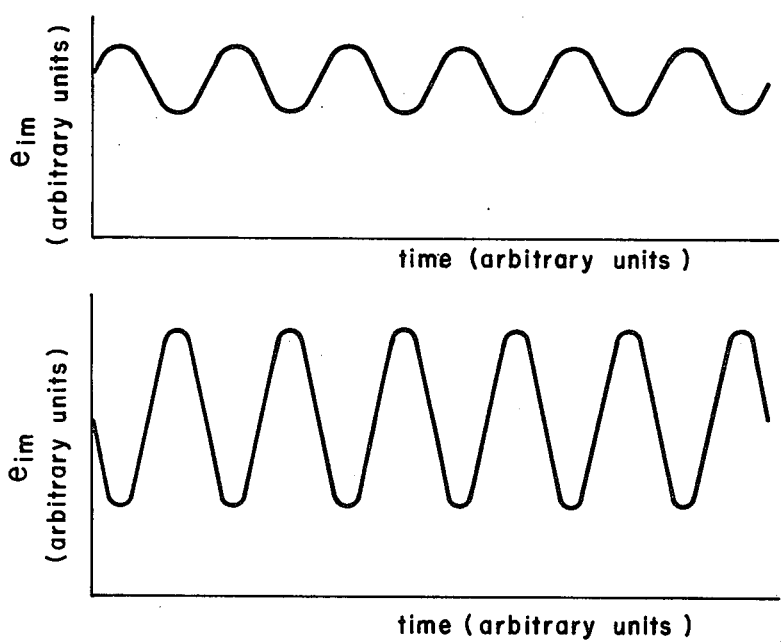
FIG. 18 is a graph of two waveforms showing results from using arrangements of the present invention.

Consider two components of the output vector element $a_m$ in Equation (7); The ith element is $b_i \sin (2\pi im/60)$, and the jth element is $b_j \sin (2\pi jm/60)$, where i and j have different integer values in the range of the index n. Suppose the matrix elements $e_{im}$ and $e_{jm}$ have positive and negative values, respectively, and that these matrix elements are represented by oscillating reflectors. Suppose, further, that the time dependence of the reflected signals is as indicated in FIG. 18, which is a graph of two waveforms plotted on scales of amplitude versus time in arbitrary units. Observe that the two oscillations shown in the figure are 180° out of phase, and the amplitudes of oscillation are not the same. That is, the reflected signals have different amplitudes, but the amplitudes of vibration of the reflectors have the same value. This is accomplished by making use of the nonlinearity of the reflection versus position of the reflector, as was illustrated in FIG. 13. When the reflected optical signals are summed at the optical port corresponding to $a_m$, the alternating components are added, constructively, when those components are of the same sign (i.e., in phase), and they are subtracted when they are of opposite sign (i.e., 180° out of phase). The constant background intensity of the summed signal is filtered out by using an AC-coupled amplifier following the receiver photodiode at each output port. Such an arrangement is shown schematically in FIG. 19, in which a photodiode 120 is shown adjacent the end of an output bundle 122 in a position to monitor the light exiting therefrom. The signal from the photodiode 120 is applied to the input of a first amplifier 124, the output of which is AC coupled through a capacitor 126 to a second amplifier 128. The amplified AC signal is then coupled through a further capacitor 130 to a diode rectifier 132, associated filter 134 and output 136. By virtue of the circuit of FIG. 19, the output vector components $a_m$ (m = 1, 2, ..., 30) are all represented by AC electronic signals (each of which may be rectified by a stage following each of AC amplifiers if DC levels are preferred over AC levels).

In general, the vibrating reflectors which represent the matrix elements in Equations (1) and (2) may be independently controlled, as by individual piezoelectric crystals each causing deflection of individual reflective surfaces, in the manner shown in FIG. 10, for example. However, in many applications such as the example of FIG. 12, all of the reflective surfaces are driven synchronously in two groups, each group being driven 180° out of phase with the other (if the matrix elements include both positive and negative senses). In the present case, it is sufficient to have all of the reflectors representing matrix elements with positive sense on one vibrating support structure and all of the reflectors representing matrix elements with negative sense on another vibrating support structure. This greatly simplifies the reflector mechanism and the drive electronics.

When the time dependence of the matrix elements is included in the output components (Equation 5), the result is $$a_m = \sum_{n=1}^{392} b_n \left| \sin \left( \frac{2\pi n m x_o}{\lambda_o} \right) \right| \sin (\omega t + p\pi), \quad (8)$$

where p = 0 when $\sin (2\pi nmx_o/\lambda_o) > 0$, and p = 1 when $\sin (2\pi nmx_o/\lambda_o) < 0$; that is to say, the index p depends on the index n. The output (product) vector components in Equation (8) are represented by (i.e., proportional to) the optical intensities at the respective output ports of the matrix multiplier disclosed herein.

Figure 19:
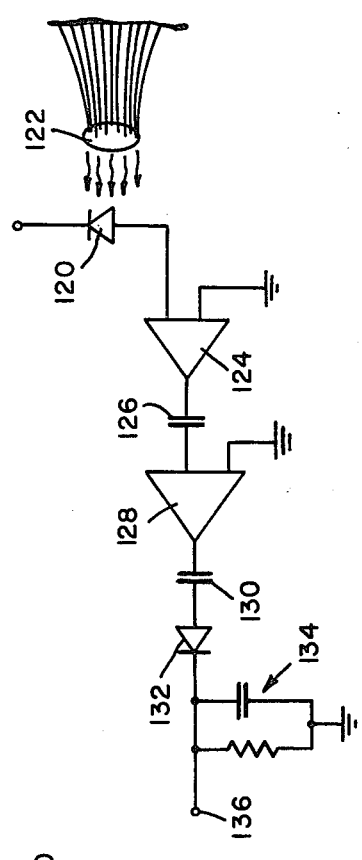
FIG. 19 is a schematic circuit diagram incorporating particular arrangements of the present invention.
Figure 20:
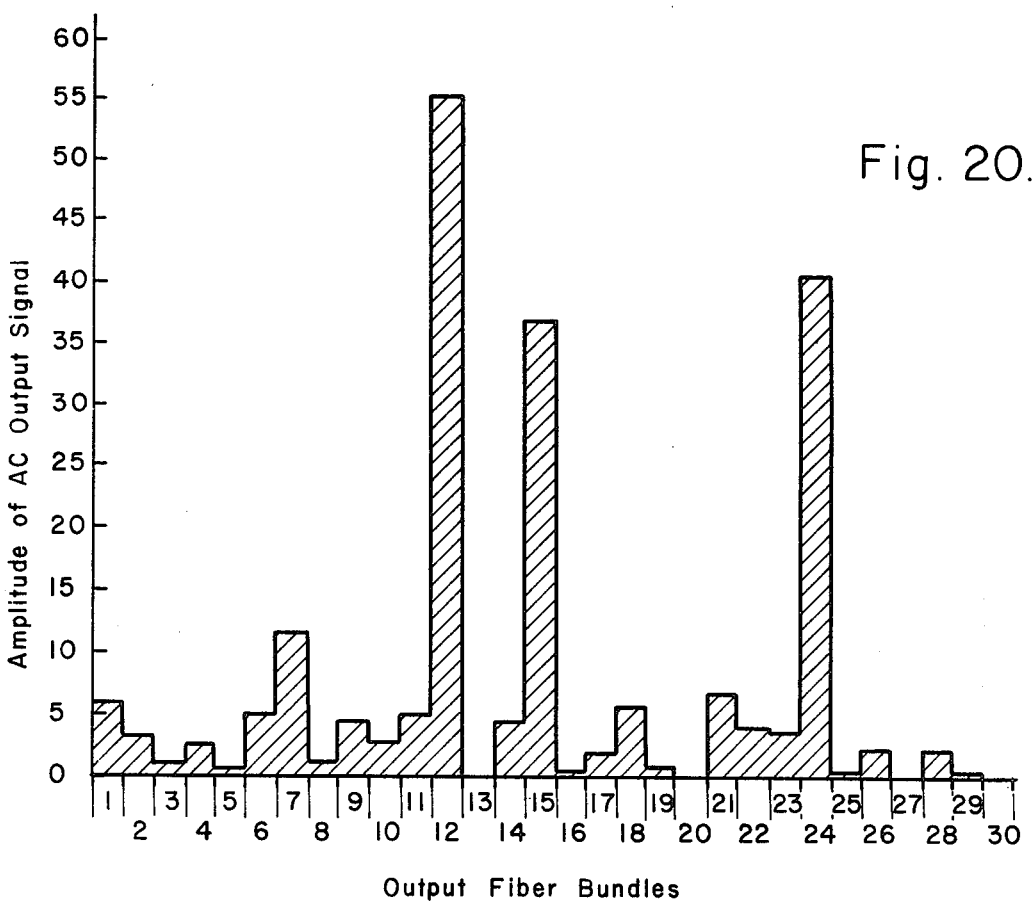
FIG. 20 is a bar graph illustrating the results of the use of arrangements of the present invention.

If the output signals represented by Equation (8) are peak detected by a circuit as shown in FIG. 19, then the 30 output levels for the present example are as shown in FIG. 20 which is a bar graph of the Fourier transform of the image pattern in FIG. 17. The strong signals emanating from output bundles Nos. 12, 15, and 24 are the first harmonic corresponding to a period of five spaces (FIG. 14), the second harmonic corresponding to a period of eight spaces (FIG. 16), and the second harmonic corresponding to a period of 17 spaces (FIG. 15), respectively. This signature is characteristic of the patterns in FIGS. 14–17 and of the particular dimensions of the matrix multiplier.

The resolution limits of the Fourier transform obtained from this matrix multiplier increase as the numbers of input and output vector components are increased. Since, in the present example, $\lambda_o/x_o$ was selected to be equal to 60, and since neither eight nor 17 factor into 60, the fundamental harmonics for these periods do not appear in the output array shown in FIG. 20. However, if the number of matrix elements, and the number of output bundles, had been increased by a factor of two, then the fundamental harmonic for the 8-space period would have appeared prominently at the 15th bundle (because 120÷8=15).

Although there have been described above specific arrangements of a fiber optic matrix multiplier in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A matrix multiplier system comprising:
   a plurality of unidirectional fiber optic couplers, each having an input fiber, a bidirectional fiber, and an output fiber and being effective to couple light signals from the input fiber unidirectionally to the bidirectional fiber in a first direction of light transmission with light traversing the bidirectional fiber in a reverse direction being directed to the output fiber;

means for applying a multi-dimensional vector signal to the plurality of input fibers; and means for reflecting light transmitted along the bidirectional fiber in said first direction back along the fiber in the reverse direction in accordance with a multi-dimensional matrix having selected components for individually controlling the reflection of light signals back into the individual bidirectional fibers to develop a second multi-dimensional vector at said output fibers corresponding to the multiplication of the first multi-dimensional vector by said matrix.

2. The system of claim 1 further including means for applying light signal inputs to the input fibers arranged in a first selected configuration and means for developing output signals from the output fibers arranged in a second selected configuration different from the first configuration.

3. The system of claim 2 wherein the input fibers are selectively grouped in bundles with a different light input signal applied to each different input fiber bundle.

4. The system of claim 3 wherein the output fibers are selectively grouped in bundles, each output fiber bundle including an output fiber from a coupler corresponding to each of the separate input fiber bundles.

5. The system of claim 1 wherein all of the input fibers are grouped in a single bundle and all of the output fibers are grouped in a separate bundle, and further comprising means for applying a visual image to the input fiber bundle.

6. The system of claim 2 further including an optical diffuser associated with a selected bundle of output fibers for presenting a uniform output for light received along any one of the output fibers in said bundle.

7. The system of claim 1 wherein a first plurality of said fiber optic couplers comprises a corresponding plurality of launch fibers of a first diameter arrayed side by side on a first curved block and embedded in epoxy resin affixed to the block and a corresponding plurality of throughput fibers of a second diameter which is greater than said first diameter arrayed side by side along a second curved block and embedded in epoxy resin affixed to the second block, the epoxy resin of each of the blocks having a planar surface with at least portions of the cores of the respective fibers exposed at said surface, the launch fibers being severed and presenting bevelled end surfaces generally equal in extent and mating with the exposed core portions of the throughput fibers in the second block, the two blocks being joined together at their respective planar surfaces in optically coupling alignment between corresponding pairs of launch fibers and throughput fibers.

8. The system of claim 1 wherein the plurality of unidirectional fiber optic couplers comprises substantially identical couplers, at least a portion of which are arranged side by side in an integral array between respective support blocks including pluralities of grooves across respective arcuate surfaces with epoxy resin in place thereon to embed the respective fibers, the respective blocks being joined together at flat surfaces formed by lapping the epoxy resin and the fibers of the respective blocks to expose mating portions of the two sets of fibers comprising the couplers.

9. The system of claim 1 wherein the reflecting means comprises means for selectively and individually modulating the light signals from the respective bidirectional fibers and reflecting the resulting modulated light signals back into the bidirectional fibers.

10. The system of claim 9 wherein the modulating means comprises individual reflecting elements adjacent the ends of the bidirectional fibers.

11. The system of claim 10 wherein the individual reflecting elements are individually adjustable to determine the spacing between each reflecting element and the adjacent end of the corresponding bidirectional fiber.

12. The system of claim 11 wherein each individual reflecting element comprises a piezoelectric crystal mounted on an adjusting member threadably engaged in an adjacent support block.

13. The system of claim 10 wherein the reflecting elements comprise planar portions of a monolithic piezoelectric member, the respective planar portions being stepped at selected distances from the respective bidirectional fiber ends in accordance with the modulation intended for the respective bidirectional fiber light signals.

14. The system of claim 13 wherein the piezoelectric member has a stepped profile on a face adjacent the bidirectional fiber ends, said profile including a plurality of planar portions situated at different distances from the respective bidirectional fiber ends.

15. The system of claim 10 further including means for developing bi-phase modulation for two different sets of bidirectional fibers.

16. The system of claim 15 wherein the bi-phase modulation means comprises two discrete piezoelectric members adjacent corresponding sets of bidirectional fibers, each member having a stepped profile along the face adjacent the bidirectional fibers, and means for moving the piezoelectric members in opposite phase relationship with respect to each other.

17. The system of claim 5 further including light responsive means positioned adjacent the output bundle, and circuit means coupled to the light responsive means for amplifying and further processing the electrical signal generated thereby.

18. The system of claim 1 wherein each coupler is a launch coupler comprising a launch fiber of a first diameter embedded in epoxy resin on a first curved support block and having its coupling interface termination in the form of a bevelled end of the fiber coincident with a planar surface of the resin and a throughput fiber of a second diameter which is greater than said first diameter embedded in epoxy resin on a second curved support block with a portion only of the core of the throughput fiber being exposed coincident with a planar surface of the resin on the second block to develop a coupling interface for light from the launch fiber, the bevelled end of the launch fiber and the exposed planar surface of the throughput fiber being of substantially like extent and joined together in alignment for optimum coupling of light from the launch fiber to the throughput fiber.

19. A matrix multiplier system comprising:

a plurality of launch couplers, each having a launch fiber coupled to a throughput fiber, the launch fiber comprising an input fiber for receiving light signals, the throughput fiber comprising opposed bidirectional and output fibers at respective opposite ends thereof;

means combining the input fibers in N separate bundles to receive the individual components of an N-dimensional input vector light signal;

means combining the output fibers in M separate bundles corresponding to the individual components of an M-dimensional output vector; and means for modulating light signals at the bidirectional fibers in accordance with the elements of an N-by-M-dimensional matrix to develop the output vector as a vector product of the input vector and the matrix.

20. The method of performing a matrix multiplication on a selected light image including the steps of:

applying the light image to the input fibers of a plurality of unidirectional fiber optic couplers to develop light signals corresponding to respective portions of said image at corresponding terminations of bidirectional fibers extending from said couplers;

modulating the light signals at said terminations by selectively reflecting portions of the light signals back into the bidirectional fibers; and detecting the modified image at output fibers of said couplers.

21. The method of claim 20 wherein the input fibers and the output fibers are respectively combined in separate bundles.

22. The method of claim 21 wherein the input fibers are joined together to form a first set of bundles and wherein the output fibers are respectively joined together to form a second set of bundles, the bundles of the first set being different in number from the bundles of the second set.

23. The method of claim 22 wherein each bundle of the second set includes an output fiber for a coupler associated with each fiber of the various input bundles.

24. The method of claim 20 wherein the input fibers are combined in a first bundle, the output fibers are combined in a second bundle, and the step of selectively reflecting light signals back into the bidirectional fibers comprises individually modulating the light signals in accordance with individual elements of a multi-dimensional matrix.

25. The method of claim 24 further including the steps of applying a pattern image to the bundle of input fibers, which pattern contains at least a portion of repetitive visual elements, and modulating the light signals from the bidirectional fibers in accordance with the individual components of a multi-dimensional matrix to develop at the output fibers an indication of periodicity of the visual elements in said pattern.

26. The method of claim 20 wherein the image applying step comprises applying light signals constituting respective components of an N-dimensional vector to the input fibers, and wherein the modulating step comprises multiplying the output of the bidirectional fibers by respective elements of an N-by-M-dimensional matrix to develop at the output fibers an M-dimensional vector corresponding to the vector product of the N-dimensional vector by the matrix.

27. A method of matrix multiplication comprising the steps of:

applying light signals representing a multi-dimensional vector to the input fibers of the plurality of fiber optic launch couplers;

modulating the resulting light signals at the bidirectional output fibers of said launch couplers in accordance with the elements of a multi-dimensional matrix;

reflecting the modulated light signals back into the bidirectional fibers to develop at the output fibers of the launch couplers a plurality of signals representing the components of an output vector corresponding to the vector product of the input vector and the matrix.

28. The method of claim 27 further including the steps of combining the input fibers in one set of bundles corresponding to the individual components of the input vector and combining the output fibers in a different set of bundles corresponding to the individual components of the output vector.

29. The method of claim 20 wherein the image applying step comprises applying the image to the input fibers of an integral launch coupler array in which the plurality of fiber optic couplers comprises a corresponding plurality of launch fibers of a first diameter arrayed side by side on a first curved block and embedded in epoxy resin affixed to the block and a corresponding plurality of throughput fibers of a second diameter which is greater than said first diameter arrayed side by side along a second curved block and embedded in epoxy resin affixed to the second block, the epoxy resin of each of the blocks having a planar surface with at least portions of the cores of the respective fibers exposed at said surface, the launch fibers being severed and presenting bevelled end surfaces generally equal in extent and mating with the exposed core portions of the throughput fibers in the second block, the two blocks being joined together at their respective planar surfaces in optically coupling alignment between corresponding pairs of launch fibers and throughput fibers.

* * * * *